United States Patent [19]

Min

[11] Patent Number: 5,690,839
[45] Date of Patent: Nov. 25, 1997

[54] METHOD FOR FORMING AN ARRAY OF THIN FILM ACTUATED MIRRORS

[75] Inventor: Yong-Ki Min, Seoul, Rep. of Korea

[73] Assignee: Daewoo Electronics Co., Ltd., Seoul, Rep. of Korea

[21] Appl. No.: 434,825

[22] Filed: May 4, 1995

[30] Foreign Application Priority Data

May 4, 1994 [KR] Rep. of Korea .................. 94-9768
Jun. 22, 1994 [KR] Rep. of Korea .................. 94-14154

[51] Int. Cl.$^6$ ............................................. G02B 5/08
[52] U.S. Cl. ...................... 216/24; 216/33; 216/36; 216/41; 359/295; 359/850
[58] Field of Search ........................ 216/24, 33, 36, 216/41, 65; 427/100, 103, 109; 359/850, 295

[56] References Cited

U.S. PATENT DOCUMENTS

5,233,456  8/1993  Nelson .................... 359/214
5,379,081  1/1995  Kim et al. ................ 353/99

*Primary Examiner*—Thorl Chea
*Attorney, Agent, or Firm*—Anderson Kill & Olick, P.C.

[57] ABSTRACT

A method for forming an array of thin film actuated mirrors for use in an optical projection system comprises the steps of: (a) providing a base; (b) depositing a separation layer on top of the base; (c) forming a first an electrodisplacive, a second, an elastic and a sacrificial layers successively on top of the separation layer; (d) forming an array of M×N supporting members, each thereof having a conduit; (e) patterning to form an array of multilayered actuated mirror structures; (f) attaching an active matrix included therein an array of transistors to the array of multilayered actuated mirror structures; (g) separating the base to form said array of thin film actuated mirrors. In the inventive method, the heat treatment of the electrodisplacive layer is carried out prior to the attaching of the active matrix, thereby preventing the transistors from being degraded by the heat.

20 Claims, 7 Drawing Sheets

METHOD FOR FORMING AN ARRAY OF THIN FILM ACTUATED MIRRORS

FIELD OF THE INVENTION

The present invention relates to an optical projection system; and, more particularly, to an array of M×N thin film actuated mirrors for use in the system and a method for the manufacture thereof.

BACKGROUND OF THE INVENTION

Among the various video display systems available in the art, an optical projection system is known to be capable of providing a high quality display in a large scale. In such an optical projection system, light from a lamp is uniformly illuminated onto an array of, e.g., M×N, actuated mirrors, wherein each of the mirrors is coupled with each of the actuators. The actuators may be made of an electrodisplacive material such as a piezoelectric or an electrostrictive material which deforms in response to an electric field applied thereto.

The reflected light beam from each of the mirrors is incident upon an aperture of, e.g., an optical baffle. By applying an electrical signal to each of the actuators, the relative position of each of the mirrors to the incident light beam is altered, thereby causing a deviation in the optical path of the reflected beam from each of the mirrors. As the optical path of each of the reflected beams is varied, the amount of light reflected from each of the mirrors which passes through the aperture is changed, thereby modulating the intensity of the beam. The modulated beams through the aperture are transmitted onto a projection screen via an appropriate optical device such as a projection lens, to thereby display an image thereon.

In FIGS. 1 and 2A to 2F, there are shown a cross sectional view of an array 10 of M×N thin film actuated mirrors 11, wherein M and N are integers, comprising an active matrix 12, an array 13 of M×N thin film actuating structures 14, an array 15 of M×N supporting members 16 and an array 17 of M×N mirrors 18, and schematic cross sectional views setting forth the manufacturing steps therefor, respectively, disclosed in a commonly owned application, U.S. Ser. No. 08/331,399, entitled "THIN FILM ACTUATED MIRROR ARRAY AND METHOD FOR THE MANUFACTURE THEREOF".

Figure 1:
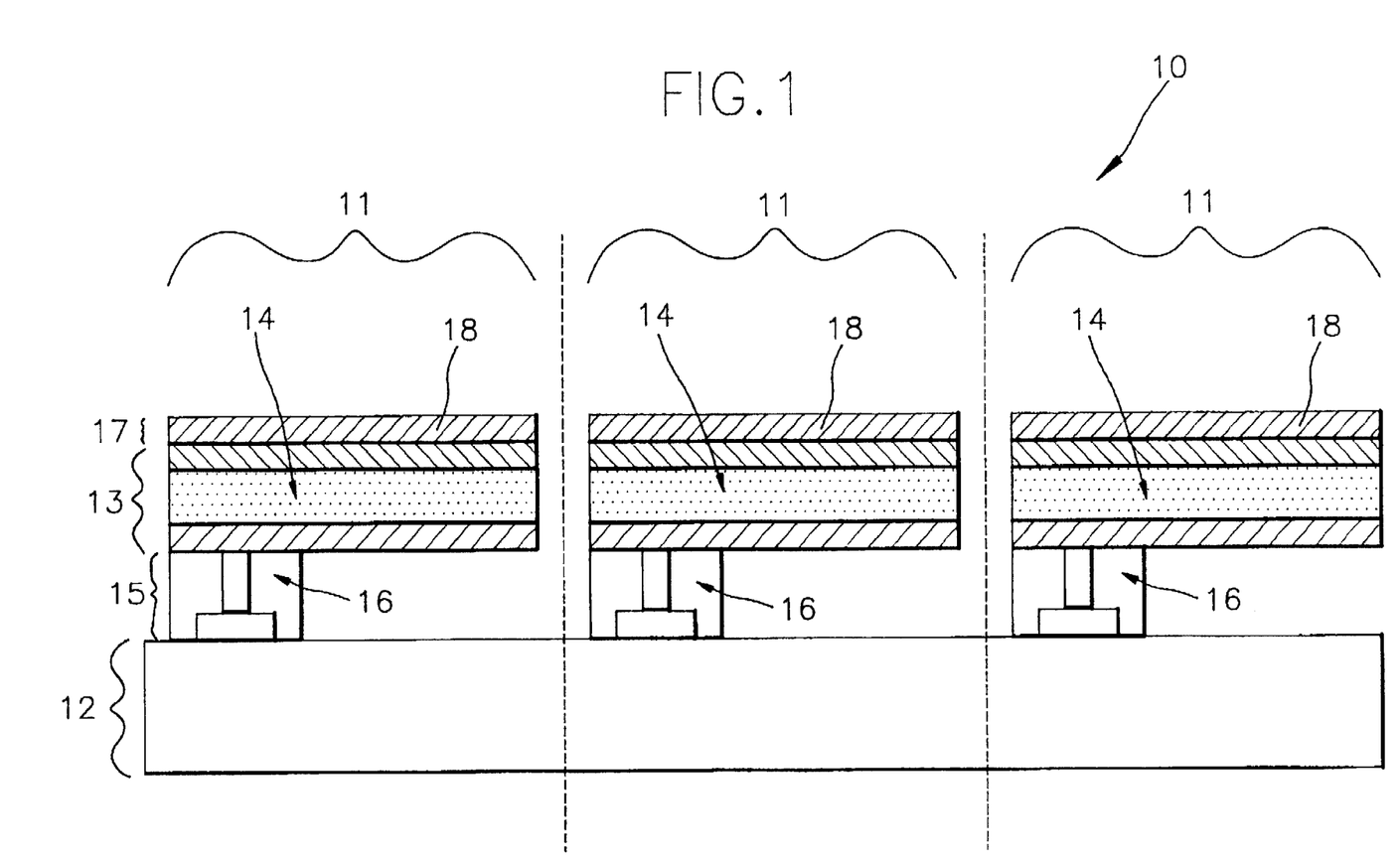
FIG. 1 shows a cross sectional view of an array of M×N thin film actuated mirrors previously disclosed.
Figure 2A:
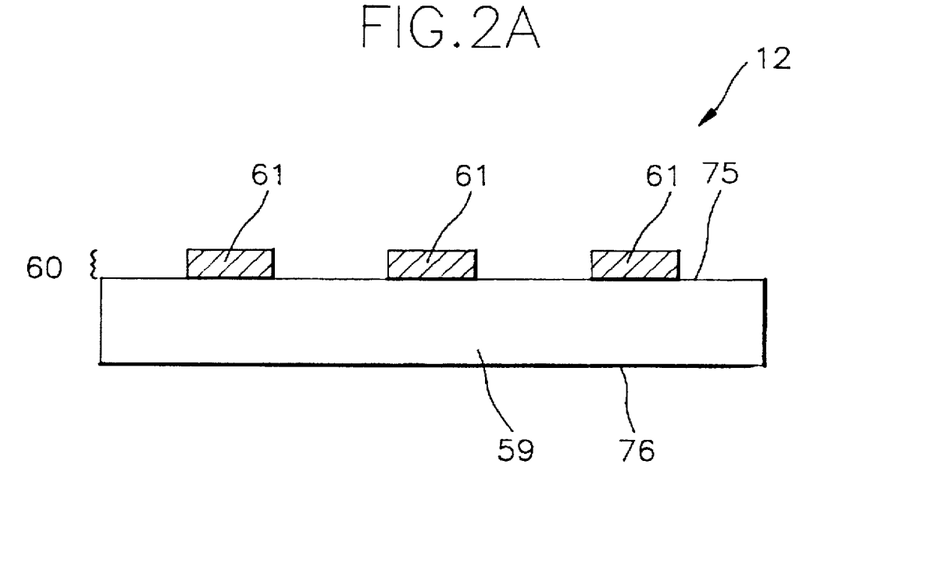
FIGS. 2(A) to 2(F) reproduce schematic cross sectional views setting forth the manufacturing steps for the array shown in FIG. 1.

The process for manufacturing the array 10 of M×N thin film actuated mirrors 11 begins with the preparation of the active matrix 12, having a top and a bottom surfaces 75, 76, comprising a substrate 59, an array of M×N transistors (not shown) and an array 60 of M×N connecting terminals 61, as illustrated in FIG. 2A.

Figure 2B:
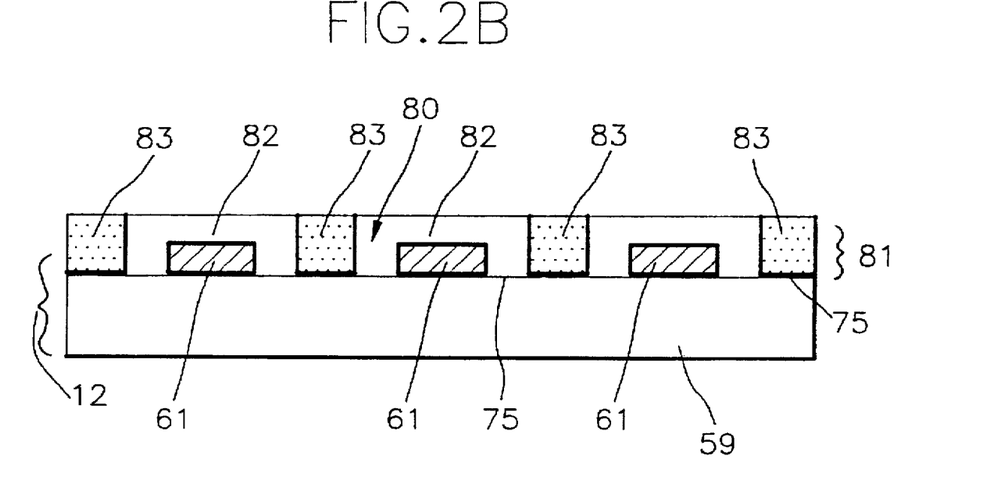

In the subsequent step, there is formed on the top surface 75 of the active matrix 12 a supporting layer 80, including an array 81 of M×N pedestals 82 corresponding to the array 15 of M×N supporting members 16 and a sacrificial area 83, wherein the supporting layer 80 is formed by: depositing a sacrificial layer (not shown) on the entirety of the top surface 75 of the active matrix 12; forming an array of M×N empty slots (not shown), to thereby generated the sacrificial area 83, each of the empty slots being located around each of the M×N connecting terminals 61; and providing a pedestal 82 in each of the empty slots, as shown in FIG. 2B. The sacrificial layer is formed by using a sputtering method, the array of empty slots, using an etching method, and the pedestals, using a sputtering or a chemical vapor deposition (CVD) method, followed by an etching method. The sacrificial area 83 of the supporting layer 80 is then treated so as to be removable later using an etching method or the application of chemicals.

Figure 2C:
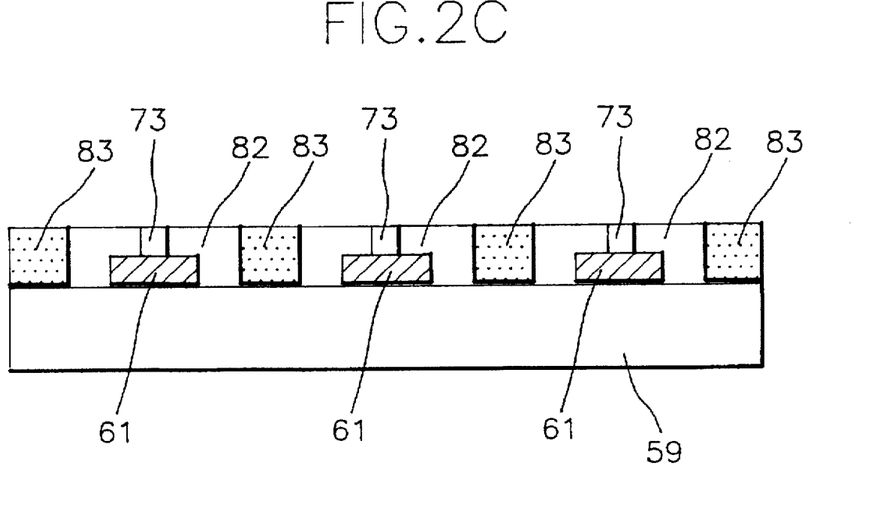

A conduit 73 is formed in each of the pedestals 82 by first creating a hole extending from top thereof to top of the corresponding connecting terminals 61 using an etching method, followed by filling therein with an electrically conducting material, as depicted in FIG. 2C.

Figure 2D:
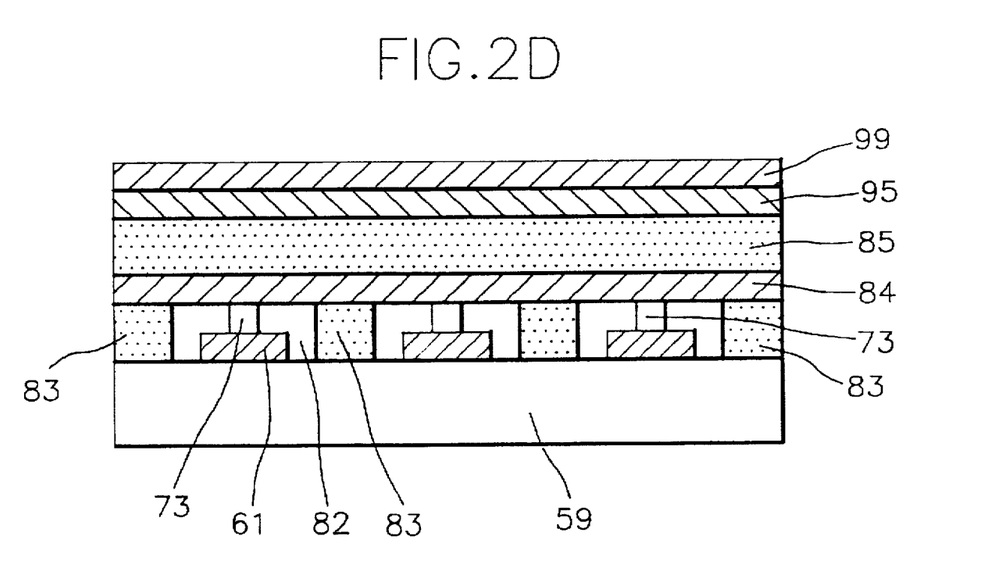

In the subsequent step, as depicted in FIG. 2D, a first thin film electrode layer 84, made of an electrically conducting material, e.g., Pt, is deposited on the supporting layer 80. Thereafter, a thin film electrodisplacive layer 85, made of an electrodisplacive material, e.g., PZT. The structure is then heat treated to allow a phase transition to take place in the thin film electrodisplacive layer 85. A second thin film electrode layer 95 is then formed on top of the thin film electrodisplacive layer 85. Each of the conduits 73 is used for electrically connecting each of the connecting terminals 61 with the first electrode layer 84 in each of the thin film actuated mirrors 11.

Subsequently, a thin film layer 99, made of a light reflecting material, e.g., Al, is provided on top of the second electrode layer 95.

Figure 2E:
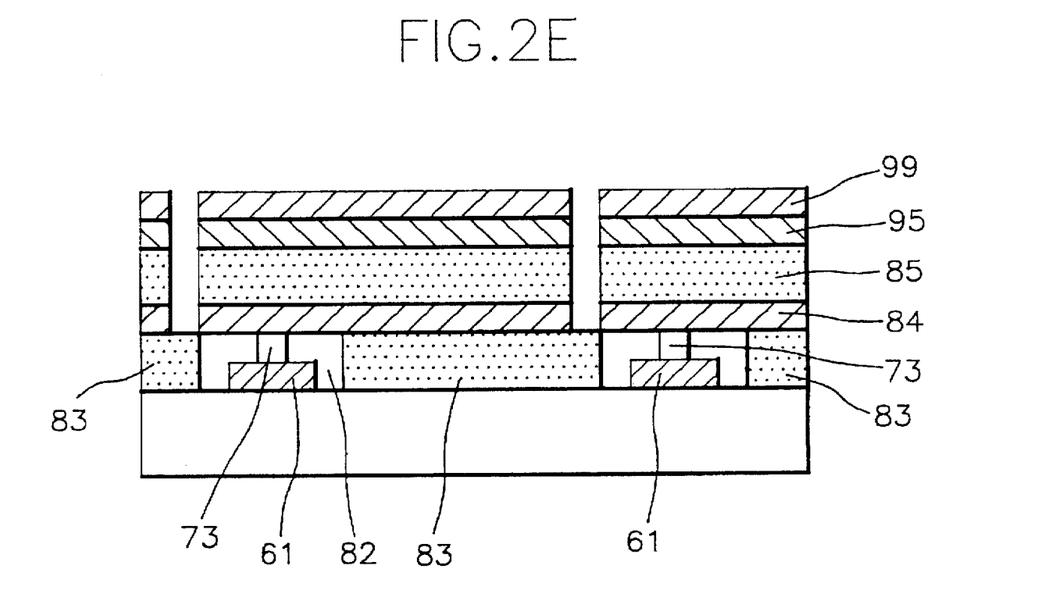

The thin film layers of the electrically conducting, the electrodisplacive, and the light reflecting materials may be deposited and patterned with the known thin film techniques, such as sputtering, sol-gel, evaporation, etching and micromachining, as shown in FIG. 2E.

Figure 2F:
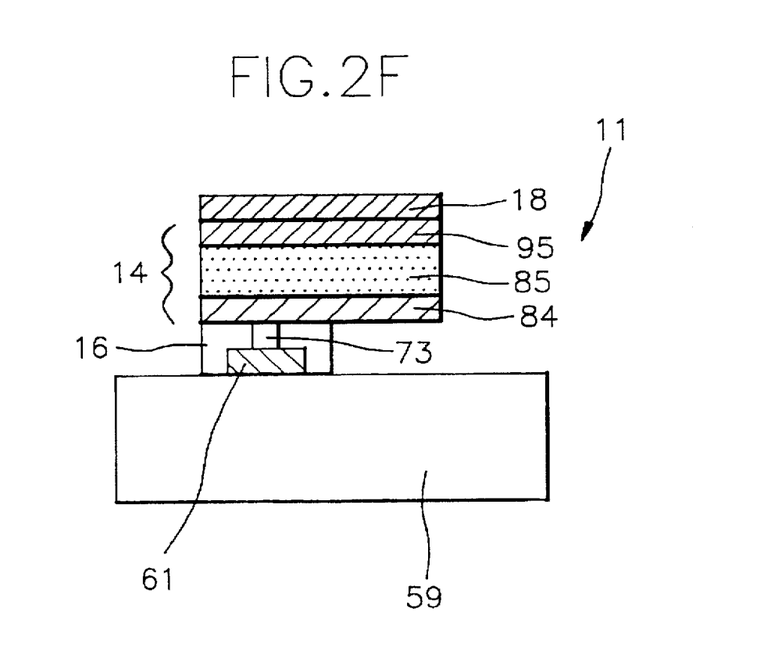

The sacrificial area 83 of the supporting layer 80 is then removed or dissolved by the application of chemical to thereby form said array 10 of M×N thin film actuated mirrors 11, as illustrated in FIG. 2F.

In the above described methods for manufacturing the array 10 of M×N thin film actuated mirrors 11, an additional process for forming an elastic layer can be added, involving a similar process as in the forming of other thin film layers.

There are a number of problems associated with the above-described method for forming the array 10 of M×N thin film actuated mirrors 11. The first and foremost to be mentioned is the degradation of the transistors in the active matrix 12 during the formation of the supporting members 16 and the electrodisplacive layer 85, requiring a high temperature.

SUMMARY OF THE INVENTION

It is, therefore, a primary object of the present invention to provide a method for forming an array of M×N thin film actuated mirrors which minimizes the degradation of the transistors in the active matrix.

In accordance with one aspect of the present invention, there is provided a method for manufacturing said array of M×N thin film actuated mirrors for use in an optical projection system, said method comprising the steps of: (a) providing a base made of an insulating material and having a top and a bottom surfaces; (b) forming a separation layer made of a water soluble material on the top surface of the base; (c) depositing a first thin film layer made of an electrically conducting and light reflecting material on top of the separation layer; (d) depositing a thin film electrodisplacive layer made of an electrodisplacive material on top of the first thin film layer; (e) forming a second thin film layer made of an electrically conducting material on top of the thin film electrodisplacive layer; (f) creating a thin film elastic layer made of a first insulating material on top of the second thin film layer; (g) depositing a sacrificial layer on top of the thin film elastic layer to thereby form a semifinished multilayered structure; (h) forming an array of M×N supporting members on the multilayered structure, each of the supporting members being made of a second insulating material by removing portions of the sacrificial layer and filling therein with the second insulating material, wherein each of the supporting members extends from top of the thin film elastic layer to top of the sacrificial layer; (i) creating a conduit in each of the supporting members by removing a portion in the corresponding supporting member and the thin film elastic layer and filling therein with a metal to thereby form a multilayered structure, wherein the portion extends from top of the corresponding supporting member to top of the second thin film layer; (j) patterning the first thin film layer, the thin film electrodisplacive layer, the second thin film layer, the thin film elastic layer and the sacrificial layer of the multilayered structure into an array of M×N multilayered actuated mirror structures, wherein each of the multilayered actuated mirror structures includes a bias electrode layer made of the light reflecting and electrically conducting material, a motion-inducing layer made of the electrodisplacive material, a signal electrode layer made of the electrically conducting material, an elastic member made of the first insulating material, a sacrificial member and the supporting member made of the second insulating material; (k) providing an active matrix comprising a substrate, an array of M×N connecting terminals and an array of M×N transistors, wherein each of the connecting terminals is connected electrically to each of the transistors; (l) attaching the active matrix on top of the array of M×N multilayered actuated mirror structures in such a way that each of the conduits in each of the supporting members is in an electrical contact with each of the connecting terminals to thereby form an array of M×N semifinished actuated mirrors; and (m) separating the base from the array of M×N semifinished actuated mirrors by dissolving the separation layer and removing the sacrificial member in each of the semifinished actuated mirrors to thereby form said array of M×N thin film actuated mirrors.

BRIEF DESCRIPTION OF THE DRAWINGS

The above and other objected and features of the present invention will become apparent from the following description of preferred embodiments given in conjunction with the accompanying drawings, wherein.

DETAILED DESCRIPTION OF THE PREFERRED EMBODIMENTS

There are illustrated in FIGS. 3A to 3G the inventive manufacturing steps involved in manufacturing an array 200 of M×N thin film actuated mirrors 201.

Figure 3A:
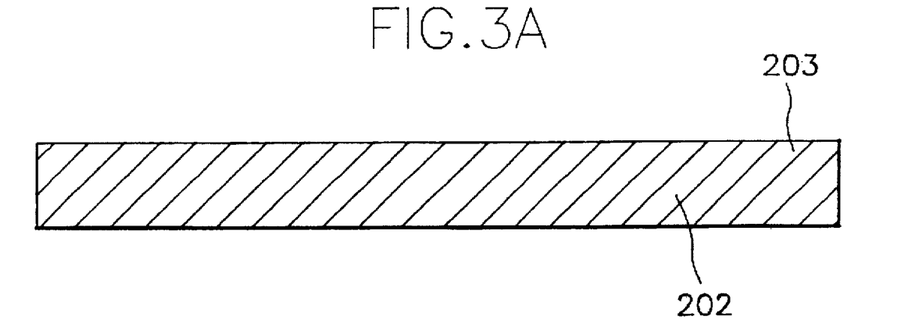
FIGS. 3(A) to 3(G) illustrate schematic cross sectional views setting forth the inventive manufacturing steps for an array of M×N thin film actuated mirrors in accordance with the present invention.

The process for manufacturing the array 200 begins with the preparation of a base 202, made of an insulating material, e.g., glass, and having a flat top surface 203, as shown in FIG. 3A.

Figure 3B:
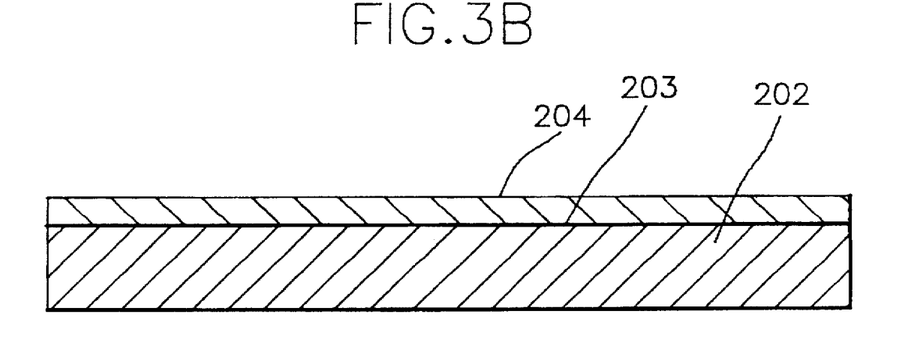

In the subsequent step, as illustrated in FIG. 3B, there is formed on the top surface 203 of the base 202 a thin film separation layer 204, made of a water soluble material, e.g., NaCl, and having a thickness of 1,000 Å to 3,000 Å, using a sputtering method or a vacuum evaporation method.

Figure 3C:
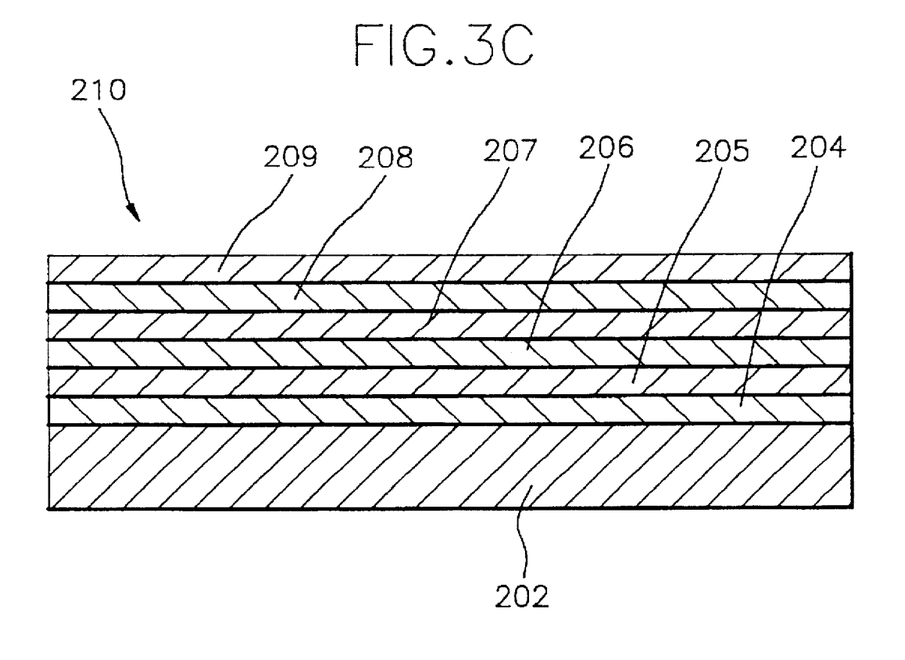

In the ensuing steps, a first thin film layer 205, a thin film electrodisplacive layer 206, a second thin film layer 207, a thin film elastic layer 208 and a thin film sacrificial layer 209 are successively formed on top of the thin film separation layer 204 to thereby form a semifinished multilayered structure 210, as shown in FIG. 3C. The first thin film layer 205, made of a light reflecting and electrically conducting material, e.g., platinum (Pt), and having a thickness of 500 Å to 1,000 Å, is formed using a sputtering method or a vacuum evaporation method, and the thin film electrodisplacive layer 206, having a thickness of 0.7 µm to 2.0 µm and made of a piezoelectric material, e.g., PZT, or an electrostrictive material, e.g., PMN, is formed using a sol-gel method or a sputtering method or a chemical vapor deposition (CVD) method. The second thin film layer 207, made of an electrically conducting material, e.g., platinum (Pt), and having a thickness of 500 Å to 2,000 Å, is formed using a sputtering method or a vacuum evaporation method. The thin film elastic layer 208 is made of a first insulating material, e.g., silicon oxide ($SiO_2$). The thin film sacrificial layer 209, having a thickness of 1 µm to 2 µm and made of a metal, e.g., copper (Cu) or nickel (Ni), a phosphor-silicate glass (PSG) or poly-Si, is formed on top of the thin film elastic layer 208 by using a sputtering method if the thin film elastic layer 208 is made of a metal, a chemical vapor deposition (CVD) method or a spin coating if the sacrificial layer 221 is made of a PSG, and a CVD method if the sacrificial layer is made of poly-Si.

Thereafter, the semifinished multilayered structure 210 is heat treated allow a phase transition of the electrodisplacive material constituting the thin film electrodisplacive layer 206 to take place. Since the electrodisplacive layer 206 in the semifinished multilayered structure 210 is sufficiently thin, there is no need to pole it in case if it is made of a piezoelectric material; it can be poled with the electrical signal applied during the operation of the corresponding actuated mirror 201.

Figure 3D:
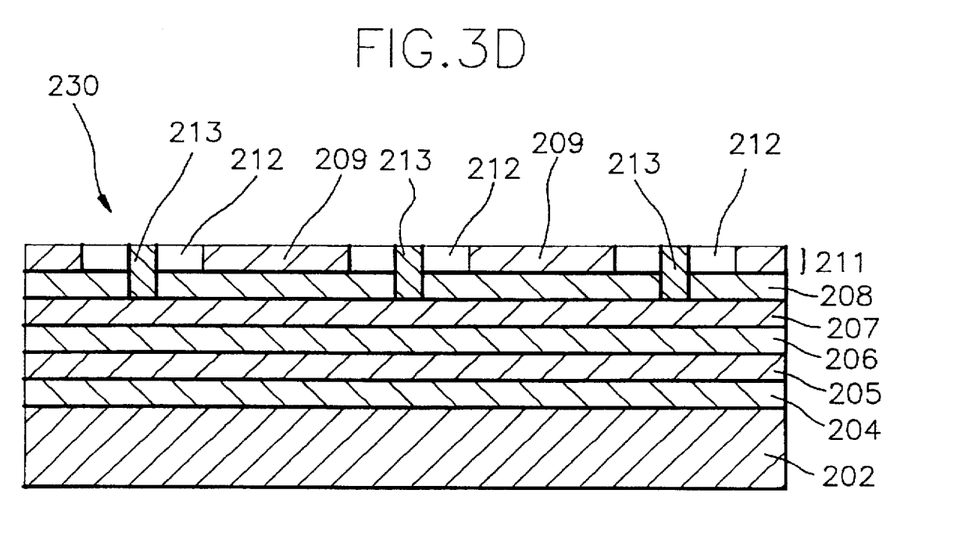

In the subsequent step, as shown in FIG. 3D, an array 211 of M×N supporting members 212 is formed on the semifinished multilayered structure 210, each of the supporting members 212 being made of a second insulating material, e.g., silicon nitride ($Si_3N_4$), by removing portions of the sacrificial layer 209 using a photolithography method and then filling therein with the second insulating material, wherein each of the supporting members 212 extends from top of the thin film elastic layer 208 to top of the thin film sacrificial layer 209. Thereafter, a conduit 213, made of a metal, e.g., Al, is formed in each of the supporting members 212 by first removing a portion of the corresponding supporting member 212 and the thin film elastic layer 208, thereby exposing the second thin film layer 207, and then filling therein with the metal to thereby form a multilayered structure 230, wherein the portion, and hence the conduit 213 thus formed, extends from top of the corresponding supporting member 212 to top of the second thin film layer 207.

Figure 3E:
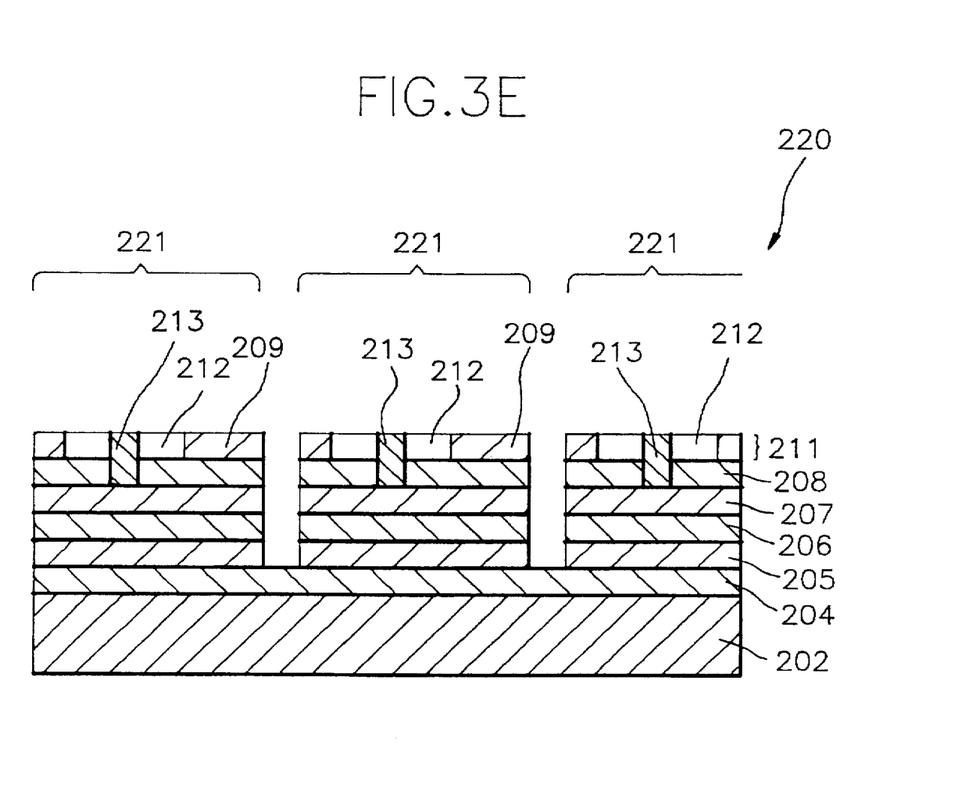

Subsequently, as shown in FIG. 3E, the first thin film layer 205, the thin film electrodisplacive layer 206, the second thin film layer 207, the elastic layer 208 and the sacrificial layer 209 of the multilayered structure 230 is patterned using a photolithography method or a laser trimming method to thereby form an array 220 of M×N multilayered actuated mirror structures 221.

Figure 3F:
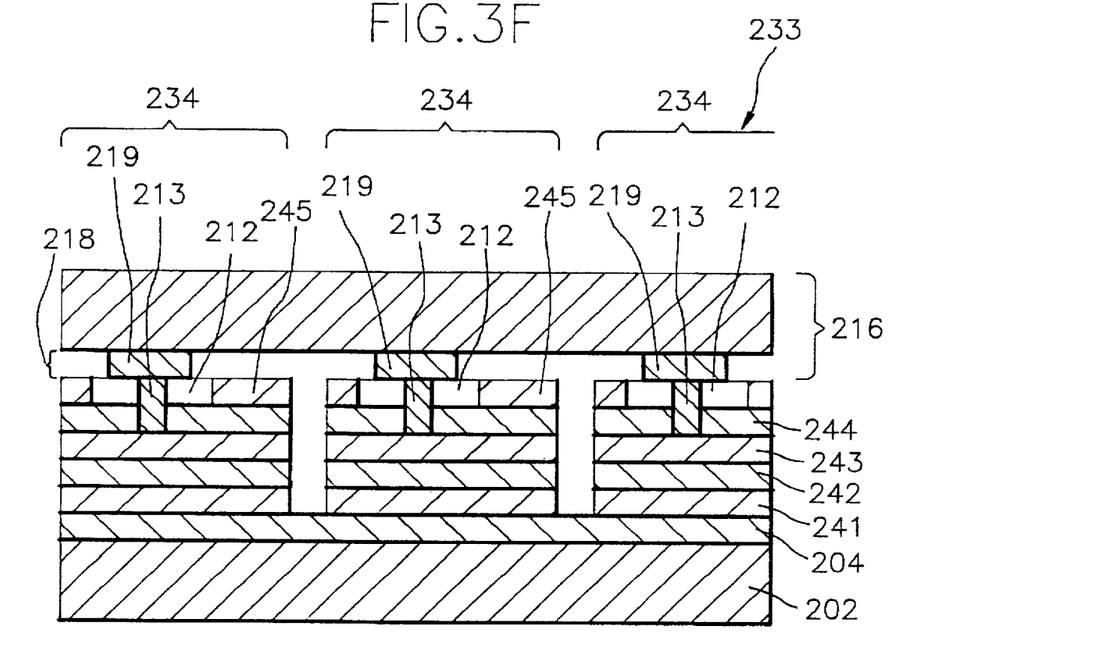

In the ensuing step, an active matrix 216, comprising a substrate 217, an array of M×N transistors (not shown) and an array 218 of M×N connecting terminals, 219, each of the connecting terminals 219 being connected electrically to each of the transistors, is attached to the array 220 of M×N multilayered actuated mirror structures in such a way that each of the conduits 213 in each of the supporting members 212 is in an electrical contact with each of the connecting terminals 219 to thereby form an array 233 of M×N semifinished actuated mirrors 234, as shown in FIG. 3F, wherein each of the semifinished actuated mirrors 234 includes a bias electrode 241 made of the light reflecting and electrically conducting material, a motion-inducing layer 242 made of the electrodisplacive material, a signal electrode 243 made of the electrically conducting material, an elastic member 244 made of the first insulating material, the supporting member 212 made of the second insulating material and an sacrificial member 245.

Figure 3G:
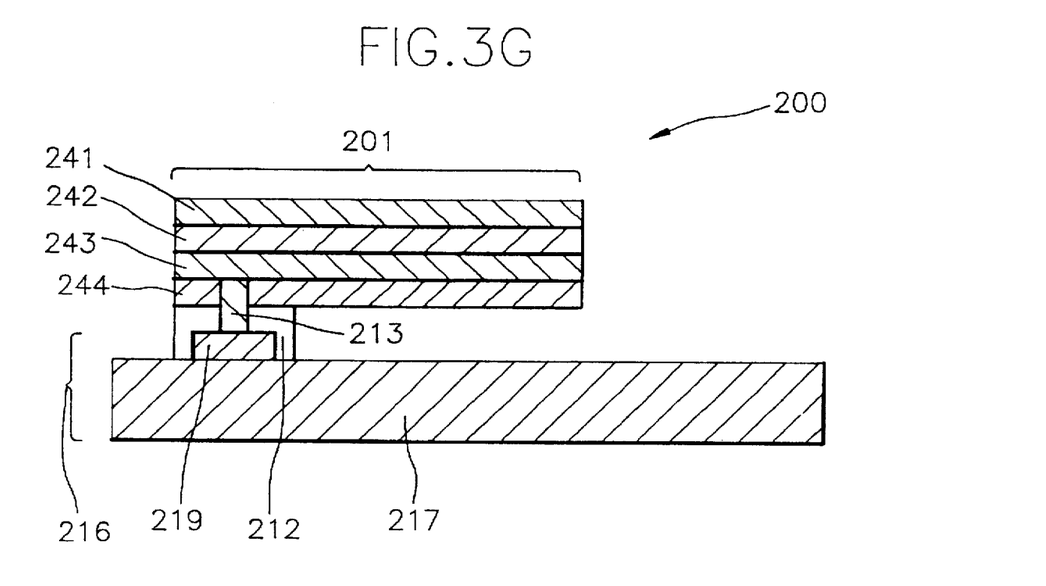

Thereafter, the base 202 is separated from the array 233 of M×N semifinished actuated mirrors 234 by dissolving the separation layer 204, and the sacrificial members 245 in each of the semifinished actuated mirrors 234 are then removed using an etching method to thereby form the array 200 of M×N thin film actuated mirrors 201 as shown in FIG. 3G.

In contrast to the method for forming the array 200 of M×N thin film actuated mirrors 201 disclosed previously, wherein the heat treatment for forcing the phase transition of the electrodisplacive material constituting the electrodisplacive layer 206 to occur take place after the active matrix 216 has been attached, in the inventive method, the heat treatment takes place prior to the attaching of the active matrix 216, thereby preventing the degradation of the transistors in the active matrix 216 due to the heat.

While the present invention has been described with respect to certain preferred embodiments only, other modifications and variations may be made without departing from the scope of the present invention as set forth in the following claims.

What is claimed is:

1. A method for manufacturing an array of M×N thin film actuated mirrors for use in an optical projection system, wherein M and N are integers, said method comprising the steps of:

(a) providing a base made of an insulating material, the base having a top and a bottom surfaces;

(b) forming a separation layer made of a water soluble material on the top surface of the base;

(c) depositing a first thin film layer made of an electrically conducting and light reflecting material on top of the separation layer;

(d) forming a thin film electrodisplacive layer made of an electrodisplacive material on top of the first thin film layer;

(e) providing a second thin film layer made of an electrically conducting material on top of the thin film electrodisplacive layer;

(f) depositing a thin film elastic layer made of a first insulating material on top of the second thin film layer;

(g) depositing a sacrificial layer on top of the thin film elastic layer to thereby form a semifinished multilayered structure;

(h) forming an array of M×N supporting members on the semifinished multilayered structure by removing portions of the sacrificial layer and filling therein with a second insulating material, wherein each of the supporting members extends from top of the thin film elastic layer to top of the sacrificial layer;

(i) forming a conduit in each of the supporting members by removing a part of each of the supporting members and parts of the thin film elastic layer and filling therein with a metal to thereby forms multilayered structure including the first thin film layer, the thin film electrodisplacive layer, the second thin film layer, the thin film elastic layer and the sacrificial layer, the conduit extending from top of each of the supporting members to top of the second thin film layer;

(j) patterning the multilayered structure into an array of M×N multilayered actuated mirror structures, wherein each of the multilayered actuated mirror structures includes a bias electrode layer, a motion-inducing layer, a signal electrode layer, an elastic member, a sacrificial member and the supporting member, the bias electrode layer, the motion-inducing layer, the signal electrode layer, the elastic member and the sacrificial member being a part of the first the film layer, the thin film electrodisplacive layer, the second thin film layer, the thin film elastic layer and the sacrificial layer, respectively;

(k) providing an active matrix including a substrate, an array of M×N connecting terminals;

(l) attaching the active matrix on top of the array of M×N multilayered actuated mirror structures in such a way that each of the conduits in each of the supporting members is in an electrical contact with each of the connecting terminals to thereby form an array of M×N semifinished actuated mirrors; and (m) separating the base from the array of M×N semifinished actuated mirrors by dissolving the separation layer and removing the sacrificial member in each of the semifinished actuated mirrors to thereby form said array of M×N thin film actuated mirrors.

2. The method of claim 1, wherein the sacrificial members are removed by an etching method.

3. The method of claim 1, wherein the first and the second insulating materials are same.

4. The method of claim 1, wherein the first and the second insulating materials are different from each other.

5. The method of claim 1, wherein the sacrificial layer is made of a metal.

6. The method of claim 5, wherein the sacrificial layer is formed by sputtering.

7. The method of claim 1, wherein the sacrificial layer is made of a poly-Si.

8. The method of claim 7, wherein the sacrificial layer is formed by chemical vapor deposition.

9. The method of claim 1, wherein the sacrificial layer is made of a phosphor-silicate glass.

10. The method of claim 9, wherein the sacrificial layer is formed by spin coating.

11. The method of claim 1, wherein the first thin film layer is formed by sputtering.

12. The method of claim 1, wherein the first thin film layer is formed by vacuum evaporation.

13. The method of claim 1, wherein the thin film electrodisplacive layer is formed by sputtering.

14. The method of claim 1, wherein the thin film electrodisplacive layer is formed by chemical vapor deposition.

15. The method of claim 1, wherein the second thin film layer is formed by sputtering.

16. The method of claim 1, wherein the second thin film layer is formed by vacuum evaporation.

17. The method of claim 1, wherein the multilayered structure is patterned by photolithography.

18. The method of claim 1, wherein the multilayered structure is patterned by laser trimming.

19. The method of claim 1, wherein the separation layer is formed by sputtering.

20. The method of claim 1, wherein the separation layer is formed by vacuum evaporation.

* * * * *